INVENTOR.
RICHARD A. LEE
BY
O. J. Beattie
ATTORNEY

April 22, 1952 R. A. LEE 2,593,902
COMPENSATOR
Filed July 14, 1949 2 SHEETS—SHEET 2
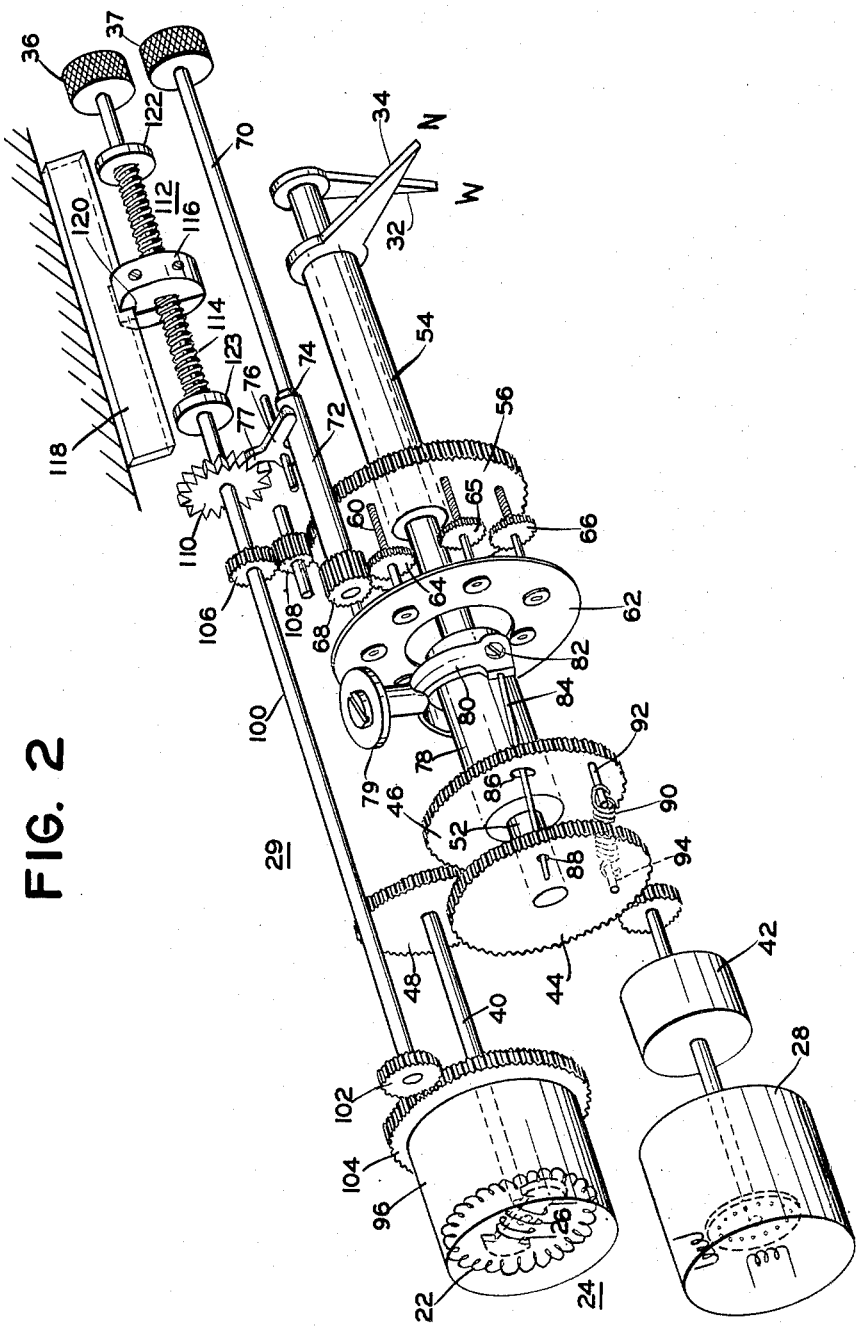
INVENTOR.
RICHARD A. LEE
BY
*O. J. Bratlie*
ATTORNEY Patented Apr. 22, 1952

2,593,902

UNITED STATES PATENT OFFICE 2,593,902

COMPENSATOR

Richard A. Lee, West Englewood, N. J., assignor to Bendix Aviation Corporation, Teterboro, N. J., a corporation of Delaware Application July 14, 1949, Serial No. 104,630

12 Claims. (Cl. 33—224)

The present invention relates to repeaters and more particularly to a repeating and indicating system for remote indicating compasses.

At the present time, compasses are generally of two types, the magnetic needle type and the earth inductor type which utilizes some element other than a magnetic needle, usually a closed coil spinning in the earth's field for generating voltages that are made to actuate an indicating mechanism to indicate a course or bearing in azimuth. Such compasses are well known, but have heretofore had many limitations which restrict their usefulness as a navigation instrument.

One of the principal difficulties of such compasses has been to repeat the compass position at a remote repeater indicating instrument, and to compensate such repeating instrument for known errors in the compass itself as shown in a calibration chart thereof, for variation errors introduced by the environment in which the instrument is placed, and deviation errors caused by the discrepancy between the location of the magnetic and geographic poles, respectively.

In the past, corrections have been made by making the needle of the repeater instrument dependent upon the configuration of a flexible cam track which may be adjusted at a plurality of points thereon by individual set screws. In order to get to the set screws, a removable cover had to be provided so that the set screws could be adjusted by a screwdriver or a wrench. Aside from being cumbersome, such an arrangement had the distinct disadvantage that unless the operator was thoroughly familiar with the instrument and thus, able to select the correct set screw, the instrument was often put out of commission by misadjustment. This is particularly serious when the accuracy of a computer is dependent upon the correctness of the repeating instrument, which very often is the case.

The present invention contemplates the provision of a novel device interposed between a master instrument, such as a magnetic compass, and a repeater instrument, whereby the repeater instrument may easily be corrected for all the above errors.

One of the objects of the present invention, therefore, is to provide a novel, simple and improved adjusting mechanism for a repeater instrument.

Another object is to provide a novel adjusting mechanism for a repeater instrument, whereby corrections may be made at a preselected number of positions of the indicator thereof by a single, conveniently located operating member.

Another object is to provide a novel adjusting mechanism for a repeater indicator, whereby corrections for deviation and variations may be made relative to the position of a master indicator at a plurality of spaced positions of the indicator needle of the repeater indicator.

Another object of the invention is to provide a novel compass repeating system whereby corrections for inherent errors in a master compass, deviation errors and variation errors may be introduced so that the reading on a final repeater indicator need not be referred to a calibration chart, but may be read directly from the azimuth scale thereof.

Still another object is to provide novel means whereby a flexible cam may be adjusted at a plurality of points by single adjusting means.

A further object of the invention is to provide novel means whereby the contour of a cam track on which the relative position of a pair of rotatable interconnected members is dependent may be changed at a plurality of points therealong by single adjusting means.

A still further object is to provide single novel adjusting means for making a repeater indicator accurately track a master compass through 360°, and to compensate for errors in the master compass and the transmission channel.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for purposes of illustration and description only, and are not intended as a definition of the limits of the invention.

In the drawings, wherein like reference characters refer to like parts:

Figure 2 is a perspective view of the novel adjusting means per se.

Figure 1:
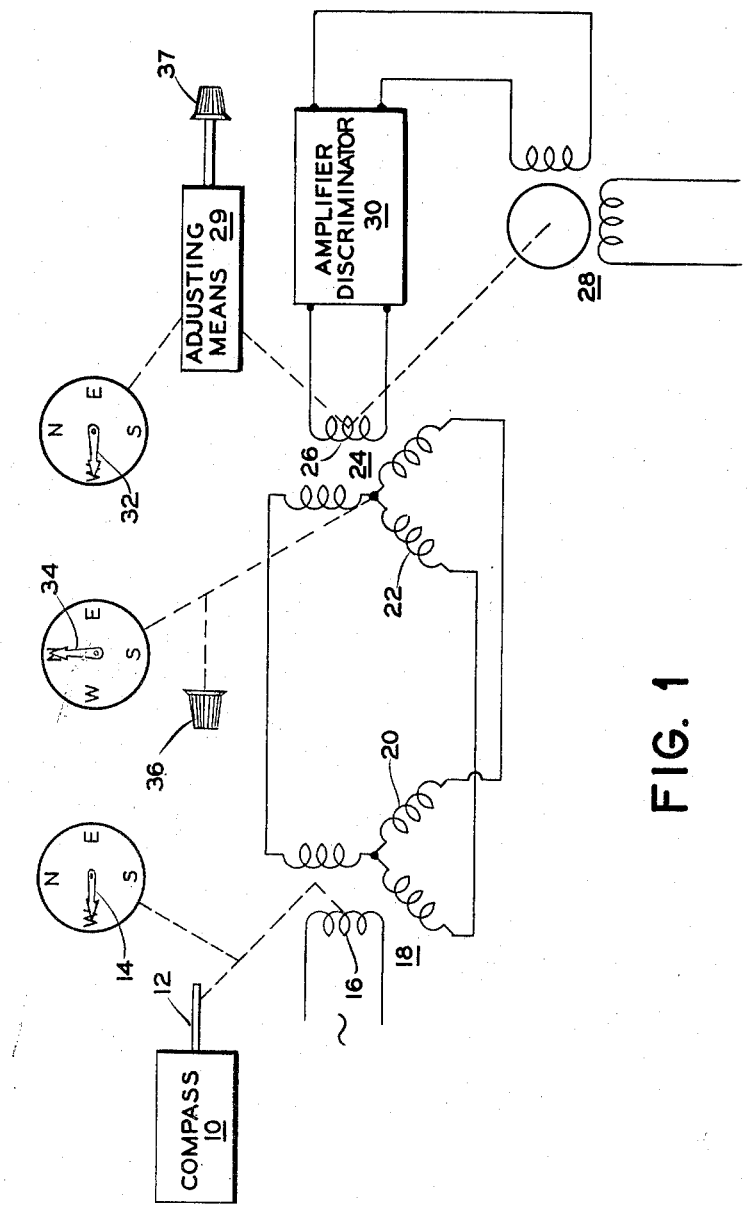
Figure 1 is a schematic wiring diagram of a system embodying the invention.

For a better understanding of the invention, reference is had to Figure 1, wherein a conventional repeater system is shown comprising a compass generally indicated at 10, which may be any type of compass or instrument capable of imparting rotation to an output member such as a shaft 12 to position an indicator 14 and rotor 16 of inductive device 18. The rotor is excited from a source of A. C. power, and movement of the rotor will induce a voltage in stator 20 of a phase depending on the direction of the displacement, which voltage will be repeated in stator 22 of inductive device 24 and will induce a voltage in rotor 26 corresponding to the voltage in rotor 16. Rotor 26 is connected to a motor 28 through an amplifier and discriminator 30, which may be of conventional design, and hence, not illustrated and described in detail.

The motor 28 is arranged to rotate the rotor back to null position when a voltage is induced therein in the usual manner. An indicator 32 is connected to and positioned with rotor 26 through adjusting means 29, which will presently be described, to indicate the position of compass 10 and repeat the position of indicator 14. Indicator 34 is connected to and positioned with stator 22 by a manually operable knob 36.

In the system so far described, the pointer of indicator 14 will show the position of compass 10 on an azimuth scale. The magnetic element of the compass, however, will not point to true north even if influenced solely by the earth's magnetism, and this error, commonly termed variation, may be corrected for by manually operating knob 36 to rotate stator 22 an amount corresponding to the variation at the particular location of the craft on which the compass is mounted. The amount of corrections inserted is shown by indicator or variation pointer 34.

When compass 10 is situated in an environment that distorts the earth's magnetic field, errors due to deviation from the earth's field will, unless corrected, cause the pointer of indicators 14 and 32 to give an erroneous magnetic bearing. According to the present invention, a novel cam correcting or compensating mechanism, generally indicated at 29, is inserted in the link connecting rotor 26 of inductive device 24 with indicator 32.

One embodiment of the novel compensating mechanism is shown in perspective view in Figure 2, wherein wiring has been omitted for the sake of clarity. Motor 28 is shown as being connected to rotor shaft 40 of inductive device 24 through reduction gearing generally indicated at 42, interconnected gears 44 and 46 and pinion 48. Pinion 48, which is mounted on rotor shaft 40, is connected to heading pointer 32 through gears 44 and 46 and shaft 52 secured to gear 44. Variation pointer 34 is mounted on sleeve 54 surrounding shaft 52 which sleeve is rigidly connected to gear 56. Spaced from gear 56 and movable therewith through a plurality of annularly spaced screw threaded shanks 60 is an annular flexible ring or cam track 62. In the illustrated embodiment there are 12 shanks spaced at intervals of 30°. The shanks are in threaded engagement with gear 56 and rotatably fastened to cam track 62 in such a manner as to be axially stationary therewith. Splined to the shanks, or made integrally therewith, are gears, three of which are identified as 64, 65 and 66, arranged to be selectively engageable with pinion 68. Pinion 68 is rotatable with manually operable knob 37 and connected thereto by a shaft 70. Shaft 70 is axially movable and has an expanded section 72 connected thereto by a ramp 74.

A detent 76 having a sharp heel portion 77 is spring biased against shaft 70. By manually pulling knob 37 outwardly or to the right, as viewed in the drawing, stop 76 will slide up ramp 74 to permit engagement of pinion 68 with a preselected one of gears 64, 65, 66, etc., whereby the distance between gear 56 and flexible cam track 62 at this particular point may be varied by turning knob 37. By successively engaging pinion 68 with all the gears 64, 65, 66, etc., cam track 62 may be given any desired axial deformation, within certain limits, with respect to a plane perpendicular to the axis of rotation of shaft 52 or sleeve 78 rotatably mounted thereon. A cam follower, such as a roller member 79, is carried by a forked member 80 pivoted to sleeve 78 as by pins 82.

Cam track 62 may be of spring steel and its surface will readily conform to adjustment resulting in a smooth track for roller 79. Rigidly connected to member 80 is a rod 84 extending through a slot or opening 86 in gear 46 but out of engagement therewith through a hole 88 in gear 44. A spring 90 is attached to pin 92 extending from gear 46 and to pin 94 extending from gear 44, as shown, and biases gear 44 in a clockwise direction, as seen from the right in the drawing, with respect to gear 46. This will force the edge of hole 88 against rod 84, which in turn will bias roller 79 against cam track 62 through the bell crank formed by rod 84 and forked member 80.

Thus, it will be seen that, as roller 79 is rotated relative to cam track 62, axial distortions of the cam track will cause relative rotational movement between gear 46, which is rotatably fixed with respect to the roller 79 and forked member 80, and gear 44 which is held fast by motor 28 and reduction gearing 42. Sleeve 78 surrounds shaft 52 and is free to rotate relative thereto.

The casing 96 of the inductive device 24 and hence stator 22 is rotatable by manually operable knob 36 acting on gear 104 through a shaft 100 and pinion 102 secured thereto. Gear 104 may be made integrally with casing 96 or suitably mounted thereon. Also mounted on shaft 100 is a gear 106 meshing with intermediate free gear 108 which in turn is in mesh with gear 56.

Also mounted on shaft 100 and keyed thereto in alignment with detent 76 is a notched disc 110. The notches are so spaced that when one of gears 64, 65, 66 is in meshing position with gear 68, the heel 77 of detent 76 will be in front of one of the notches. When knob 36 and shaft 70 are pulled outwardly or to the right as viewed in the drawing, detent 76 will ride up ramp 74 onto expanded section 72 of the shaft and thus force the heel 77 of the detent into the notch so as to prevent rotation of knob 36 when pinion 68 is in adjustable position. Detent 76 will also, of course, prevent the withdrawal of shaft 70 except when one of the gears 64, 65 and 66 is in meshing position with gear 68.

In order to limit the total rotation of the casing 96 to 180° each way from zero position, a stop mechanism, generally indicated at 112, is provided. This stop mechanism may be of any convenient design and is shown in the drawing as including a threaded portion 114 of shaft 100. A split nut 116 is in engagement with the threaded portion and is prevented from rotating therewith as by a stationary member 118 riding in a groove 120 in the split nut. The travel of the split nut in either direction is limited by stops 122 and 123.

Coming now to the operation of the above-described device, let us assume that the craft is headed or pointed in such a direction that the pointer 14, Fig. 1, indicates a bearing of 270°, and that all the parts are in the position illustrated in Fig. 2. If, from an appropriate standard, it appears that the indicated bearing should be, for instance, 260°, adjustment is made by turning knob 37, whereby the meshing gear 64 will cause the point at which the gear shank is attached to the gear track 62 to be moved away from or toward gear 56 as the case may be. This motion will be transmitted to gear 46 through a bell crank fulcrumed about pins 82 in sleeve 78 and comprising cam follower 79, forked member 80 and rod 84. The pivotal movement of forked member 80 about pins 82 effects rotation of sleeve 78 and gear 46 relative to shaft 52 to drive pinion 48, thereby displacing rotor 26 to provide a signal which drives motor 28, the latter in turn driving gear 44 through reduction gearing 42. Shaft 52 and pointer 32 move with gear 44 in a direction depending upon the sense in which knob 37 is rotated. In considering the above sequential movement of elements, it is to be noted that when roller 79 is moved away from or toward cam track 62 gear 44 is held fixed by motor 28, and rod 84 is restrained from moving angularly about pins 82 because of the engagement of the rod with the edge of opening 88. Since cam roller 79 is biased against cam track 62 by the spring connection 90, 92 and 94, and is moved away from or toward the cam by the contour thereof, a turning or twisting motion of foked member 80, sleeve 78 and gear 46 relative to shaft 52 and gear 44 will be effected. The knob 37 is rotated until pointer 32 indicates true heading of 260°. Gear 68 is now disengaged from gear 64 by pushing knob 37 in or to the left, as viewed in the drawing, whereby stop 76 will return to normal position by sliding off expanded section 72 of shaft 70 and release notched disc 110, thus freeing shaft 100.

In order to bring gear 65 into engaging position with gear 68, knob 36 is turned manually until gear 65, which follows gear 64 is in proper position as indicated by suitable visual means on the dial (not shown) which may be dependent on the position of pointer 34. Now cam follower 79 has to be brought into axial alignment with the shank of gear 65, because as the heading of the ship was changed, the position of the heading pointer and hence, the position of the unit comprising gears 44 and 46, rod 84, forked member 80 and cam follower 79 was displaced a corresponding amount relative to gear 66 and cam track 62.

In order to bring roller 79 into axial alignment with the shank of gear 65, the casing 96 and hence stator 22 of inductive device 24, is, according to this invention, rotated simultaneously with rotation of gear 56 by pinion 102 mounted on shaft 100 and meshing with casing gear 104. This will cause relative movement between stator 22 and rotor 26 and a signal will be developed in the latter. This signal will cause motor 28 to rotate in such a direction as to bring the rotor back to a null position and will simultaneously bring roller 79 into proper position with respect to gear 65 and its shank when the latter gear is in meshing position with gear 68. This is brought about by properly selecting the gear ratios between pinion 102 and gear 104, and since gears 44 and 46 are resiliently coupled together by spring 90, the spring will cause gear 46 to follow gear 44 when the latter is rotated by motor 28 thereby effecting movement of roller 79 to track gear 56. It will be seen that the gear ratios between gears 106 and 56 and between pinion 102 and gear 104 are selected so that the roller 79 effectively tracks gear 56 when knob 36 is operated.

In the present illustration, gears 64, 65, 66, etc., are 30° apart, and to correct the complete azimuth scale, the craft will have to be turned at 30° intervals. Thus, as the heading of the plane is changed to indicate 300°, roller 79 will be positioned in alignment with gear 65. When knob 36 is now turned until the gear 65 is in meshing position with gear 68, roller 79 will also be in proper position by the action of motor 28 as explained above. In this position, notched disc 110 will have a notch in position to receive the heel 77 of detent 76, and by pulling knob 37 to the right, gear 68 is meshed with gear 65. Knob 68 is now adjusted until the necessary correction is set in by axially displacing flexible cam 62 at this particular point whereby the cam follower will cause relative motion between gears 44 and 46 as previously explained, and the amount of correction set in may be determined by observing the displacement of pointer 32. Gears 68 and 65 are now disengaged and the heading of the craft is changed another 30° at which time roller 79 is aligned with gear 66. Knob 36 is again turned until this gear is in meshing position with gear 68, at which time they are brought into mesh and pointer 32 is corrected for this position and so on until the complete azimuth scale of indicator 14 has been covered.

It will be apparent to those skilled in the art that this compensating mechanism may also be used to calibrate a repeater instrument in order to make it track a standard instrument precisely. By introducing a signal into the signal circuit of the standard, the standard may be caused to be displaced a preselected amount and the repeater may then be adjusted in accordance therewith by the above-described device, and, if necessary, correct it for known errors in the standard.

After the repeater instrument is properly calibrated, the magnetic variation may be inserted by movement of knob 36 until pointer 34 indicates the variation desired. This makes it convenient for the navigator to change the variation during flight.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a compensating mechanism for a repeater indicator to compensate for predetermined errors in a master compass in which rotor and stator elements of an inductive device are relatively displaceable in response to movements in said master compass, a member connected to said rotor element and movable therewith, a repeater indicator, a member connected to said indicator and movable therewith, a flexible annular cam track, a plurality of adjustable means connected to said cam track and spaced therealong to change the contour thereof, a cam follower adapted to follow the contour of said cam track associated with one of said members and comprising a bell crank pivotally mounted on said one member and adapted to engage the other member, resilient means connecting said members and providing a driving connection between said members and permitting relative displacement therebetween proportional to variations in the contour of said flexible cam track, manually operated actuating means arranged for engagement with successive adjustable means, and means connected to the stator element and cam track for manually rotating said cam track to bring a preselected one of said adjustable means into engagement with said actuating means and simultaneously rotating the stator element of said inductive device to bring said cam follower into responsive position relative to said preselected adjustable means.

2. Means for compensating a compass for deviation errors comprising an angularly displaceable cage carrying a deformable cam track thereon, a plurality of spaced adjustable members supported by the cage and engaging the cam track whereby adjustment of said members provides axial deformation of the track, a pivotally mounted cam follower engaging the cam track and pivoted in accordance with the deformations on the track, a manually operable member for selectively operating said adjustable members, and a second manually operable member engaging said cage for displacing the latter to bring a preselected one of said adjustable members in engagement with said first manually operable member.

3. Means for compensating a compass for deviation errors comprising an angularly displaceable member carrying a deformable cam track thereon, a plurality of spaced adjustable members supported by the member and engaging the cam track whereby adjustment of said members provides axial deformation of the track, an angularly displaceable and pivotally mounted cam follower riding on the cam track and pivoted in accordance with the deformations on the cam track, a manually operable member for selectively operating said adjustable members, a second manually operable member engaging said displaceable member for displacing the latter to bring a preselected one of said adjustable members in engagement with said first manually operable member, and means operated by said second manually operable member for displacing said cam follower to a position in alignment with said preselected adjustable member.

4. Means for compensating a compass for deviation errors comprising an angularly displaceable member carrying a deformable cam track thereon a plurality of spaced adjustable members supported by the member and engaging the cam track whereby adjustment of said members provides axial deformation of the track, an angularly displaceable and pivotally mounted cam follower riding on the cam track and pivoted in accordance with the deformations on the cam track, a manually operable member for selectively operating said adjustable members, a second manually operable member engaging said displaceable member for displacing the latter to bring a preselected one of said adjustable members in engagement with said first manually operable member, a signal developing device operated by said second manually operable member for developing a control signal, and a motor operated by said signal for displacing said cam follower to a position in alignment with said preselected adjustable member.

5. The combination in a craft compass system having a displaceable device for developing a signal corresponding to a predetermined heading change, a pointer, and a motor energized by the signal for returning the device to a no-signal position and displacing the pointer to indicate the new craft heading, of means for compensating pointer movement for deviation error comprising an axially deformed cam track, a pivotally mounted cam follower engaging said track and connected to the motor for movement along said track, said folllower being pivoted in accordance with the deformation of said track, and a connection between said follower and the signal device for displacing the latter an amount proportional to the pivotal movement of the cam follower whereby a signal is developed by the device to operate said motor to thereby displace said pointer an additional amount.

6. In a repeater system of the type including a master indicator, a repeater indicator, and induction means responsive to movements of said master indicator for actuating said repeater indicator, a compensating device interposed between said master indicator and said repeater indicator for compensating for errors in said master indicator and comprising a member rotatable by said induction means, a cam follower carried by said member, a member connected to said repeater indicator, a cam track, means for biasing said cam follower against said cam track, means connecting said members for transmitting to one of said members the angular movement of the other of said members altered by an amount proportional to the movement of the cam follower produced by the cam action of the cam track, a plurality of adjustable means spaced along said cam track for changing the contour thereof, actuating means for said contour changing means, and means connected to said cam track for driving said cam track to selectively bring each one of said cam track contour-changing means into engagement with said actuating means and for simultaneously bringing said cam follower into alignment with the preselected cam track contour-changing means.

7. A compensating device comprising a first rotatable member, a cam follower carried by and rotatable with said member, a cam track engaged by said follower so that the latter follows the contour of said cam track, a second rotatable member, means connecting said members for transmitting to one of said members the angular movement of the other of said members altered by an amount proportional to the movement of the cam follower produced by the cam action of the cam track, a plurality of adjustable means spaced along said cam track for changing the contour thereof, manually operable actuating means mounted in juxtaposition with said contour-changing means, said actuating means being adapted upon manual operation thereof to be brought into a position to engage one of said contour-changing means, and means for selectively bringing each one of said contour-changing means into engagement with said actuating means.

8. A compensating device comprising a first rotatable member, a cam follower carried by and rotatable with said member, a cam track engaged by said follower so that the latter follows the contour of said cam track, a second rotatable member, means connecting said members for transmitting to one of said members the angular movement of the other of said members altered by an amount proportional to the movement of the cam follower produced by the cam action of the cam track, a plurality of adjustable means spaced along said cam track for changing the contour thereof, actuating means for said contour-changing means, and means connected to said cam track for driving said cam track to selectively bring each one of said contour-changing means into engagement with said actuating means and for simultaneously bringing said cam follower into alignment with the preselected cam track contour-changing means.

9. A compensating device comprising a flexible annular cam track, means for adjusting the contour of said cam track at a plurality of spaced points therealong, a roller member biased against said cam track and pivotally mounted on a sleeve member so as to engage said cam track and follow the contour thereof, a disc rigidly mounted on said sleeve, a shaft, a disc mounted on said shaft adjacent said first-mentioned disc, means connecting said discs for transmitting to one of said discs the angular movement of the other of said discs altered by an amount proportional to the movement of the roller member produced by the cam action of the cam track, actuating means for said contour adjusting means, and means for selectively bringing each one of said contour adjusting means into engagement with said actuating means.

10. A compensating device for compensating for compass errors in a master compass, comprising an annular deformable cam track, a cam follower for cooperation with said cam track, a member movable with an indicator, a member movable with said master compass, means connecting said members for transmitting to one of said members the angular movement of the other of said members altered by an amount proportional to the movement of the cam follower produced by the cam action of the cam track, adjustable means for said cam track spaced therealong to change the contour thereof, manually operable actuating means mounted in juxtaposition with said adjustable means, said actuating means being adapted upon manual depression thereof to be brought into a position to engage one of said adjustable means, and means for bringing a preselected one of said adjustable means into engagement with said actuating means.

11. A compensating device for compensating for compass errors in a master compass, comprising an annular deformable cam track, a cam follower for cooperation with said cam track, a member movable with an indicator, a member movable with said master compass, means connecting said members for transmitting to one of said members the angular movement of the other of said members altered by an amount proportional to the movement of the cam follower produced by the cam action of the cam track, adjustable means for said cam track spaced therealong to change the contour thereof, manually operable actuating means mounted in juxtaposition with said adjustable means, said actuating means being adapted upon manual operation thereof to be brought into a position to engage one of said adjustable means, and means connected to said cam track for driving said cam track to bring a preselected one of said adjustable means into engagement with said actuating means and for simultaneously bringing said cam follower into alignment with the preselected cam track contour-changing means.

12. Compensating means comprising a driving member and a driven member, a flexible cam track, a plurality of compensating means cooperating with said cam track to change the contour of said cam track and spaced therealong, a cam follower displaceable according to variations in the contour of said cam track and means connecting said members for transmitting to one of said members the angular movement of the other of said members altered by an amount proportional to the movement of the cam follower produced by the cam action of the cam track, manually operable actuating means mounted in juxtaposition with any one of said compensating means, said actuating means being adapted upon manual operation thereof to be brought into a position to engage one of said compensating means, and a manually operable means connected to said cam track for driving said cam track to bring a preselected one of said compensating means into engaging position with said actuating means and simultaneously causing said cam follower to be brought into position to indicate the change of contour imparted to said cam track by movements of said compensating means by said actuating means.

RICHARD A. LEE.

REFERENCES CITED

The following references are of record in the file of this patent:

UNITED STATES PATENTS

| Number | Name | Date |
| --- | --- | --- |
| 1,779,145 | Proctor | Oct. 21, 1930 |
| 1,807,919 | Kolster | June 2, 1931 |
| 2,308,566 | Noxon | Jan. 19, 1943 |